(12) United States Patent
Wang

(10) Patent No.: US 12,330,957 B1
(45) Date of Patent: Jun. 17, 2025

(54) METHOD OF PRODUCING ANNEALING SEPARATOR, ANNEALING SEPARATOR, AND GRAIN-ORIENTED MAGNETIC STEEL

(71) Applicant: SETOLAS HOLDINGS, INC., Takamatsu (JP)

(72) Inventor: Xingdong Wang, Takamatsu (JP)

(73) Assignee: SETOLAS HOLDINGS, INC., Takamatsu (JP)

( * ) Notice: Subject to any disclaimer, the term of this patent is extended or adjusted under 35 U.S.C. 154(b) by 0 days.

(21) Appl. No.: 19/045,718

(22) Filed: Feb. 5, 2025

Related U.S. Application Data

(63) Continuation of application No. 18/269,533, filed as application No. PCT/CN2021/120926 on Sep. 27, 2021.

(30) Foreign Application Priority Data

Jun. 18, 2021 (CN) .......................... 202110675696.8

(51) Int. Cl.
*C01F 5/08* (2006.01)
(52) U.S. Cl.
CPC ............ *C01F 5/08* (2013.01); *C01P 2004/61* (2013.01); *C01P 2004/62* (2013.01);
(Continued)

(58) Field of Classification Search
None
See application file for complete search history.

(56) References Cited

U.S. PATENT DOCUMENTS

2014/0246124 A1    9/2014   Okubo et al.

FOREIGN PATENT DOCUMENTS

| CN | 102417196 A | 4/2012 |
|----|-------------|--------|
| CN | 107758706 A | 3/2018 |

(Continued)

OTHER PUBLICATIONS

Horiba, Ltd., Analysis Troubleshooting Seminar "X-Ray Fluorescence Analysis", JASIS2016 (Analytical Exhibition 2016/Scientific Equipment Exhibition 2016), Sep. 7-9, 2016.

(Continued)

*Primary Examiner* — Colin W. Slifka
(74) *Attorney, Agent, or Firm* — MARSHALL, GERSTEIN & BORUN LLP

(57) ABSTRACT

The invention provides a method of producing an annealing separator, an annealing separator and a grain-oriented magnetic steel. An annealing separator obtained by the method has high purity and excellent dispersibility and bonding strength, thus allowing formation of a uniform, dense forsterite layer on the surface of a grain-oriented magnetic steel. The method of producing an annealing separator comprises the following steps: step (1) in which magnesium oxide and an ammonium salt solution are mixed and reacted to prepare a magnesium salt solution and ammonia, and then the purified magnesium salt solution and the ammonia are reacted to obtain magnesium hydroxide, step (2) in which one portion of the obtained magnesium hydroxide is subjected to high temperature ageing at 155 to 230° C. while another portion of the obtained magnesium hydroxide is subjected to low temperature ageing at 10 to 100° C., and step (3) in which the magnesium hydroxides aged under the different conditions are mixed and burned to obtain magnesium oxide for use as an annealing separator.

6 Claims, 2 Drawing Sheets

(52) U.S. Cl.
CPC ...... *C01P 2006/16* (2013.01); *C01P 2006/22* (2013.01); *C01P 2006/80* (2013.01)

(56) References Cited

FOREIGN PATENT DOCUMENTS

| | | | |
|---|---|---|---|
| CN | 108977638 | A | 12/2018 |
| CN | 111186850 | A | 5/2020 |
| CN | 111302366 | A | 6/2020 |
| CN | 113388725 | A | 9/2021 |
| JP | S52-24499 | A | 2/1977 |
| JP | S54-128928 | A | 10/1979 |
| JP | S61-079781 | A | 4/1986 |
| JP | S62-139880 | A | 6/1987 |
| JP | S64-62476 | A | 3/1989 |
| JP | H08-283866 | A | 10/1996 |
| JP | H1046259 | A | 2/1998 |
| JP | 2001-303259 | A | 10/2001 |
| JP | 2002-309378 | A | 10/2002 |
| JP | 2003027251 | A | 1/2003 |
| JP | 2003-268450 | A | 9/2003 |
| JP | 2005-002362 | A | 1/2005 |
| JP | 2005-171387 | A | 6/2005 |
| JP | 2008-164547 | A | 7/2008 |
| JP | 2009-007642 | A | 1/2009 |
| JP | 2009029728 | A | 2/2009 |
| JP | 2012-001752 | A | 1/2012 |
| JP | 2016-145419 | A | 8/2016 |
| JP | 2016-199460 | A | 12/2016 |
| JP | 2017062204 | A | 3/2017 |
| JP | 2017-128773 | A | 7/2017 |
| JP | 2017-179459 | A | 10/2017 |
| JP | 2019-173172 | A | 10/2019 |
| JP | 2019-173173 | A | 10/2019 |
| WO | WO-2002/034965 | A1 | 5/2002 |
| WO | WO-2013/051270 | A1 | 4/2013 |
| WO | WO-2017/169854 | A1 | 10/2017 |

OTHER PUBLICATIONS

Uemoto, Concept of limit of detection and limit of quantitation, The Japan Society for Analytical Chemistry, 216-212, (May 2010).
Rigaku Corporation, Osaka Branch, ZSX Primus IV analysis performance, Mar. 6, 2024.
Industrial Technology Center, Kochi Prefecture, Results report (ICP-AES), Mar. 11, 2024.
Industrial Technology Center, Kochi Prefecture, Results report (Fluorescent X-ray analysis), Mar. 11, 2024.
Ibiden Engineering Co., Ltd., Analysis results report (ICP mass spectrometry), Mar. 13, 2024.
Ibiden Engineering Co., Ltd., Analysis results report (Fluorescent x-ray analysis, press molded), Mar. 13, 2024.
Fujifilm Wako Pure Chemical Corporation, "Sea Sand, 300-600 μm (30-50mesh)", online store, retrieved from https://labchem-wako.fujifilm.com/jp/product/detail/W01W0119-1595.html (Apr. 8, 2024).
Fujifilm Wako Pure Chemical Corporation, "Sea sand, 425-850 μm (20-35mesh)", online store, retrieved from https://labchem-wako.fujifilm.com/jp/product/detail/W01W0119-0817.html (Apr. 8, 2024).
Fujifilm Wako Pure Chemical Corporation, "Sea Sand, 850-1400 μm (14-20mesh)", online store, retrieved from https://labchem-wako.fujifilm.com/jp/product/detail/W01W0119-1140.html (Apr. 8, 2024).
Ibiden Engineering Col, Ltd., Analysis results report (Fluorescent X-ray analysis, glass beads), Mar. 13, 2024.
Nitto Analytical Techno-Center Co., Ltd., Analysis results report (ICP-MS, XRF), Mar. 22, 2024.
"Stokes' formula" (online),Wikipedia, [retrieved on Aug. 19, 2024], URL:https://ja.wikipedia.org/wiki/stokres' formula.
"Chemical Handbook, Basics II, 4th Edition", p. II 3, 37, The Chemical Society of Japan, Sep. 30, 1993.
"Chemical Handbook, Basics II, 4th Edition", Table of Contents and p. II 3-4, The Chemical Society of Japan, Sep. 30, 1993.
Notice of Reasons for Revocation ,Opposition No. 2024-700334 (JP7362930B).
Office Action, Japanese patent application No. 7470242 (Opposition No. 2024-701010), mailing date Dec. 3, 2024.

METHOD OF PRODUCING ANNEALING SEPARATOR, ANNEALING SEPARATOR, AND GRAIN-ORIENTED MAGNETIC STEEL

FIELD

The present invention relates to a method of producing an annealing separator, to an annealing separator, and to a grain-oriented magnetic steel. Annealing separators obtained by the method have high purity and excellent dispersibility and bonding strength, thus allowing formation of uniform, dense forsterite layers on the surfaces of grain-oriented magnetic steel.

BACKGROUND

The production process for a grain-oriented magnetic steel generally involves hot rolling of a steel piece (steel ingot) with adjusted composition, annealing, cold rolling and recrystallizing annealing (decarburized annealing), followed by final finish annealing. In this production process, the final finish annealing is carried out at a high temperature of 1200° C. or higher, and it is therefore a common practice to coat the steel sheet with an annealing separator composed mainly of MgO, in order to prevent self adhesion when it is wound into a roll.

In addition to this function, MgO in the annealing separator and the main component which is precipitated on the steel sheet surface during recrystallizing annealing (decarburized annealing) react with the oxide layer of $SiO_2$ to form a forsterite layer. At the same time, the crystal growth of iron can be suppressed by removing precipitates (such as, AlN, MnS, TiN, $Si_3N_4$ and TiC) known as inhibiting factors that inhibit crystal growth of iron during the final finish annealing step. This is extremely important for forming a forsterite layer with a uniform thickness. The forsterite layer performs the role of imparting tensile strength to the steel sheet surface and reducing iron loss while increasing the magnetic property, and also imparting an insulating property to the steel sheet. In order to coat the formed forsterite layer with a phosphate-based insulating layer in subsequent steps, the forsterite layer provides a function as an adhesive for close bonding with the steel substrate during this time. Annealing separators are therefore very important for production of magnetic steel sheets.

Various strategies and techniques have been proposed for annealing separators. Specifically, for example, PTL 1 discloses technology for smoothing the base steel sheet surface while increasing the tensile strength of the steel sheet surface, and drastically reducing iron loss. However, elements that are counterproductive for reactivity are included in the materials used in PTL 1.

PTL 2 discloses a production technique for an annealing separator in which 2 to 40 parts by mass of an alkaline earth metal is added, wherein the properties and components of MgO are modified to increase the performance of the forsterite layer that is formed, and a chloride is added to promote decomposition of $SiO_2$ and thus inhibit production of silicate compounds. However, PTL 2 does not fully achieve the stated object.

PTL 3 discloses a technique relating to a highly aggregated annealing separator, the technique being a technique for producing aggregated MgO microparticles. However, the aggregated MgO microparticles tend to produce trace amounts of water residue while attempting to reduce the water and 02 contents as much as possible during production of grain-oriented magnetic steel, and this has been disadvantageous for production of high quality grain-oriented magnetic steel.

PTL 4 discloses a non-forsterite-based annealing separator, and relates to coating of a suspension composed mainly of alumina. However, because water remains on the alumina coating, an oxide layer is produced on the steel sheet surface during high temperature annealing.

PTL 5 discloses an annealing separator comprising boron element at 0.04 to 0.30 mass %, with 55 to 95% of the boron element having a coordination number of 4, and the sintering temperature, the drying time and the moisture absorption are adjusted to control the proportion of boron element having a coordination number of 4 to improve the performance of the grain-oriented magnetic steel. However, the principles of forming the tetracoordinated boron element and forsterite described in PTL 5 are contradictory and it is impossible to completely achieve the expected effect.

PTL 6 discloses an annealing separator having a boron element content of 0.04 to 0.15 mass % and chlorine element catalyst content of 0.05 mass % or lower, with a Blaine specific surface area of $2.0 \times 10^3$ to $7.0 \times 10^3$ m$^2$/kg. However, according to the Chinese standard (GB/T 8074-2008), the Blaine specific surface area is only applied for measurement of cement specific surface area and various powdered materials having specific surface areas in the range of 0.2 to 0.6 m$^2$/g, such as fly ash and granulated blast furnace slag powder. The method is not applied for measurement and characterization of porous materials such as annealing separators and ultrafine powdered materials.

PTL 7 discloses technology for an aggregated annealing separator obtained using a precursor which is highly aggregated magnesium hydroxide synthesized at low temperature (50° C. for 20 hours) using seawater as the magnesium source and calcium hydroxide as the alkali source, the annealing separator having a Blaine particle size and BET particle size ratio ($R_{Blaine}/R_{BET}$) of 3.0 to 5.5. However, as mentioned above, the Blaine specific surface area has too wide of a margin of error for porous microparticles such as magnesium oxide for annealing separators, and therefore cannot be considered applicable. Numerical values obtained using this method are therefore unreliable. According to this document, an aggregation degree of lower than 3 for magnesium oxide results in excessively rapid reaction which is unsuitable for a separator. This also runs counter to common knowledge. If the primary particles have suitably large particle sizes they can be applied to grain-oriented magnetic steel even with a low degree of aggregation. Conversely, small particle sizes for the primary particles lower the degree of aggregation, and appropriate adjustment of the magnesium oxide burning temperature allows the magnesium oxide reactivity, i.e. the reaction rate, to be effectively controlled. From a technical standpoint, therefore, this document is also invalid.

The problem of "depressed deformation" sometimes occurs in some currently marketed annealing separator products.

A need therefore exists for an annealing separator that still exhibits adequate performance. However, no annealing separator has been provided that is adequate in terms of performance.

CITATION LIST

Patent Literature

[PTL 1] Japanese Examined Patent Publication SHO No. 52-24499
[PTL 2] Japanese Unexamined Patent Publication SHO No. 64-62476
[PTL 3] PCT/JP01/09354
[PTL 4] Japanese Unexamined Patent Publication No. 2003-268450
[PTL 5] Japanese Unexamined Patent Publication No. 2017-128773
[PTL 6] Japanese Unexamined Patent Publication No. 2017-179459
[PTL 7] PCT/JP2017/010691

SUMMARY

Technical Problem

The present invention has been devised in light of the aforementioned problems of the prior art, and its object is to provide a method for producing an annealing separator, an annealing separator and a grain-oriented magnetic steel. Annealing separators obtained by the method have high purity and excellent dispersibility (suspendability) and bonding strength, thus allowing formation of uniform, dense forsterite layers on the surfaces of grain-oriented magnetic steel, and thereby making it possible to obtain grain-oriented magnetic steel having excellent insulation and electromagnetic properties.

Solution to Problem

The present inventors have conducted diligent research on this matter and have completed this invention upon finding that an annealing separator with controlled annealing separator properties, high purity and excellent dispersibility (suspendability) and bonding strength can be obtained by carrying out high temperature ageing and low temperature ageing of the magnesium hydroxide precursor used for production of the annealing separator.

Specifically, the invention provides the following:

1. A method of producing an annealing separator, wherein the method comprises:
   step (1) in which magnesium oxide and an ammonium salt solution are mixed and reacted to prepare a magnesium salt solution and ammonia, and then the purified magnesium salt solution and ammonia are reacted to obtain magnesium hydroxide,
   step (2) in which one portion of the obtained magnesium hydroxide is subjected to high temperature ageing at 155 to 230° C. while another portion of the obtained magnesium hydroxide is subjected to low temperature ageing at 10 to 100° C., and step (3) in which the magnesium hydroxides aged under the different conditions are mixed
   and burned to obtain magnesium oxide for use as an annealing separator.
2. The method according to 1. above, wherein:
   the magnesium oxide in step (1) is obtained by lightly burning magnesium hydroxide derived from natural brucite, magnesite, magnesium carbonate, basic magnesium carbonate, seawater or bittern, and
   the ammonium salt in step (1) is ammonium nitrate, ammonium sulfate or ammonium chloride.
3. The method according to 1, or 2. above, wherein:
   the high temperature ageing is carried out by heating for 120 to 180 minutes at a temperature of 160 to 180° C., and
   the low temperature ageing is carried out by heating for 120 to 180 minutes at a temperature of 50 to 90° C.
4. The method according to any one of 1. to 3. above, wherein the ratio of high-temperature aged magnesium hydroxide to low-temperature aged magnesium hydroxide is 1:8 to 8:1 in terms of magnesium hydroxide mass.
5. The method according to any one of 1. to 4. above, wherein the burning temperature is 820 to 1150° C.
6. The method according to any one of 1. to 5. above, wherein the burned magnesium oxides obtained in step (3) further include 0 to 25 wt % inactive magnesium oxide and/or 0 to 10 wt % titanium dioxide, by weight of the burned magnesium oxide.
7. An annealing separator composed mainly of magnesium oxide, wherein:
   the Na content is 20 to 50 ppm,
   the sedimentation coefficient S is 0.90 or greater, and
   the bonding strength after coating onto a steel sheet surface is 80% or greater.
8. The annealing separator according to claim 7, wherein the mean pore size of the annealing separator is 45 to 100 nm.
9. The annealing separator according to claim 7 or 8, wherein the ratio CAA70%/CAA40% in a 30° C. aqueous solution of the annealing separator is in the range of 1.8 to 4.0.
10. The annealing separator according to any one of 7. to 9. above, which further comprises at least one of the following, based on weight of magnesium oxide.
    B: 500 to 1300 ppm;
    Cl: 100 to 350 ppm;
    CaO: 0.2 to 0.6 wt %;
    $SiO_2$: 0.2 to 5.0 wt %;
    $TiO_2$: 0 to 10.0 wt %; or
    inactive magnesium oxide: 0 to 25.0 wt %.
11. The annealing separator according to any one of 7. to 10. above, wherein the mean particle size of the annealing separator particles is 0.5 to 5.0 m.
12. A grain-oriented magnetic steel that has on its surface a forsterite layer obtained using an annealing separator according to any one of 7. to 11.
13. A method of producing an annealing separator, wherein the method comprises:
    step (1) in which magnesium oxide and an ammonium nitrate solution are mixed and reacted to prepare a magnesium nitrate solution and ammonia, the magnesium nitrate solution is purified, and the ammonia is recovered and concentrated and used to prepare ammonia water, after which the purified magnesium nitrate solution and ammonia water are reacted to obtain magnesium hydroxide,
    step (2) in which one portion of the obtained magnesium hydroxide is subjected to high temperature ageing by heating for 120 to 180 minutes at a temperature of 160 to 180° C. while another portion of the obtained magnesium hydroxide is subjected to low temperature ageing by heating for 120 to 180 minutes at a temperature of 50 to 90° C., and
    step (3) in which the magnesium hydroxides aged under the different conditions are mixed in a ratio of 1:8 to 8:1 in terms of magnesium hydroxide mass and burned at 860 to 1050° C. to obtain magnesium oxide for use as an annealing separator.

14. An annealing separator composed mainly of magnesium oxide, wherein:
the Na content is 20 to 50 ppm,
the sedimentation coefficient S is 0.90 or greater,
the bonding strength after coating onto a steel sheet surface is 80% or greater, and
the mean pore size is 45 to 100 nm.

Advantageous Effects of Invention

An annealing separator obtained by the method of the invention has high purity and excellent dispersibility (suspendability) and bonding strength, thus allowing formation of uniform, dense forsterite layers on the surfaces of grain-oriented magnetic steel, and thereby making it possible to obtain grain-oriented magnetic steel having excellent insulation and electromagnetic properties.

DESCRIPTION OF EMBODIMENTS

Figure 1:
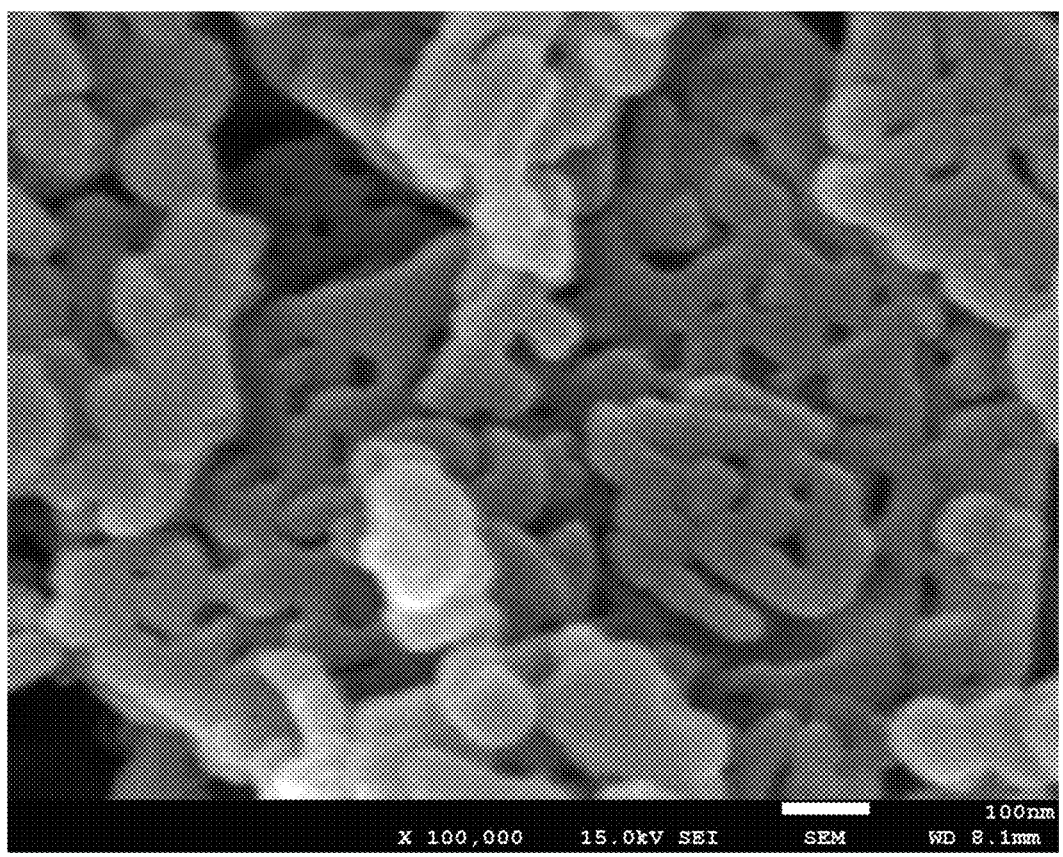
FIG. 1 is a field emission scanning electron microscope (FE-SEM, 100,000×) photograph of the annealing separator prepared in Example 4 of the invention.

[Method for Producing Annealing Separator]
The method for producing an annealing separator of the invention comprises the following steps:
Step (1): Magnesium oxide and an ammonium salt solution are mixed and reacted to prepare a magnesium salt solution and ammonia, and then the purified magnesium salt solution and ammonia are reacted to obtain magnesium hydroxide,
Step (2) One portion of the obtained magnesium hydroxide is subjected to high temperature ageing at 155 to 230° C. while another portion of the obtained magnesium hydroxide is subjected to low temperature ageing at 10 to 100° C., and
Step (3): The magnesium hydroxides aged under the different conditions are mixed and burned to obtain magnesium oxide for use as an annealing separator (this may also be referred to hereunder as "magnesium oxide for an annealing separator").
The production method of the invention purifies a magnesium oxide starting material by chemical reaction to obtain a highly pure starting material, further reacting it to obtain a magnesium hydroxide precursor, further carrying out high temperature ageing and low temperature ageing on the obtained magnesium hydroxide precursor, and mixing the high-temperature aged magnesium hydroxide with the low-temperature aged magnesium hydroxide and burning the mixture, thereby controlling the physical properties of the obtained magnesium oxide for an annealing separator. This process can provide an annealing separator having high purity and excellent dispersibility (suspendability) and bonding strength, thus allowing formation of a uniform, dense forsterite layer on the surface of a grain-oriented magnetic steel, and thereby making it possible to produce a grain-oriented magnetic steel having excellent insulation and electromagnetic properties.
According to the production method of the invention, there is no particular restriction on the magnesium oxide source, and it may be any known magnesium oxide source commonly used in the field, examples of which include magnesium oxide obtained by light burning of magnesium hydroxide derived from seawater or bittern. From the viewpoint of availability and purity, however, lightly burned magnesium oxide obtained by light burning of starting materials such as natural brucite, magnesite, magnesium carbonate and basic magnesium carbonate (i.e., $4MgCO_3 \cdot Mg(OH)_2 \cdot 4H_2O$ or $Mg_5(CO_3)_4(OH)_2 \cdot 4H_2O$) may be used. Because natural brucite, magnesite and basic magnesium carbonate sources are widely distributed and have high magnesium oxide contents, these can be used as starting materials to obtain high magnesium oxide contents by simple light burning (burning at 800 to 1000° C.). Light burning of the starting material can also remove hydroxide ion and carbonate ion in the raw ore to obtain a stably active magnesium oxide starting material.

The ammonium salt to be reacted with magnesium oxide in the production method of the invention is not particularly restricted, and solutions of ammonium nitrate, ammonium sulfate or ammonium chloride are examples. Ammonium nitrate is preferred among these.

The production method of the invention will now be explained using ammonium nitrate solution as an example.

When an ammonium nitrate solution is used, the specific chemical reactions for the production method of the invention are as follows.

$$MgO + 2NH_4NO_3 \rightarrow Mg(NO_3)_2 + 2NH_3\uparrow + H_2O \quad (1)$$

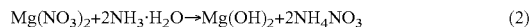

$$Mg(NO_3)_2 + 2NH_3 \cdot H_2O \rightarrow Mg(OH)_2 + 2NH_4NO_3 \quad (2)$$

$$Mg(OH)_2 \rightarrow MgO + H_2O \quad (3)$$

A magnesium hydroxide precursor is first produced in the method. Specifically, magnesium oxide is dissolved in an ammonium nitrate solution, mixing and reacting the magnesium oxide and ammonium nitrate solution to prepare a magnesium nitrate solution and ammonia gas. The magnesium nitrate solution is purified by filtration to produce a purified magnesium source, and the purified magnesium nitrate solution is then reacted with ammonia water to obtain magnesium hydroxide. The magnesium oxide starting material is purified based on the chemical reactions represented as chemical reaction formulas (1) and (2), lowering the impurity content to obtain magnesium hydroxide of very high purity. The ammonia water can be obtained by recovering and concentrating the generated ammonia gas. If ammonia generated by this reaction is used as an alkali source, it can be circulated throughout the system for repeated use, thus reducing material costs and aiding in industrialization.

The ammonium nitrate solution reacted with magnesium oxide in this method may have a molar concentration of 0.5 to 8.0 mol/L, preferably 1.0 to 7.0 mol/L and more preferably 1.5 to 6.0 mol/L.

The magnesium oxide used in the method may be in the form of a powder or slurry, and when used as a slurry the molar concentration may be 0.5 to 4.0 mol/L, preferably 0.8 to 3.8 mol/L and more preferably 1.0 to 3.5 mol/L.

For the method of the invention, the reaction charging ratio of the magnesium oxide and ammonium nitrate solution is not particularly restricted, although from the viewpoint of increasing the reaction rate and improving production volume, the ammonium nitrate/magnesium oxide molar ratio may be 1.6 to 2.40, preferably 1.7 to 2.30 and more preferably 1.8 to 2.20. Specifically, magnesium oxide powder may be added to the ammonium nitrate solution in an amount of 1000 to 1200 kg/hr for production on an industrial scale, for example, to obtain the molar ratio of ammonium nitrate and magnesium oxide mentioned above. During reaction between the magnesium oxide and ammonium nitrate solution, heat treatment may also be carried out as necessary to promote the reaction. The heat treatment conditions are not particularly restricted, and heat treatment conditions commonly employed in the field may be used. Heating may be at 90 to 140° C., for example.

In the method of the invention, the magnesium nitrate solution obtained by the reaction is filtered to remove the unreacted magnesium oxide and other insoluble matter, obtaining a high-purity magnesium nitrate solution as a magnesium source. The ammonia generated by the reaction may be recovered with water and concentrated to 5 to 15.0 mol/L, for example, for use as an alkali source.

The magnesium nitrate solution and ammonia water obtained in the method of the invention are reacted to obtain a magnesium hydroxide precursor. The mixing (reaction) temperature during the reaction is not particularly restricted, and is sufficient if it causes the reaction to proceed. A reaction temperature, for example, may be 5 to 60° C. If the reaction temperature is within this range, it will be possible to avoid excessively strong aggregation of the product precursor due to high temperature, which produces adverse effects on the reactivity of the resulting annealing separator, and to avoid problems of slowed reaction caused by excessively low temperature and increased energy consumption for control of the reaction temperature, which are disadvantageous for large-scale industrial production. The reaction temperature is preferably 20 to 30° C. and more preferably 25° C.

In the method of the invention, the magnesium hydroxide precursor is subsequently aged. Magnesium hydroxide precursors are commonly produced at low temperature in prior art methods; however, aggregation of particles becomes more prominent at low temperature. According to the invention, a portion of the obtained magnesium hydroxide precursor is subjected to high temperature ageing at a temperature of 155 to 230° C., while another portion is subjected to low temperature ageing at a temperature of 10 to 100° C. Ageing at different temperatures results in crystal growth of two types of magnesium hydroxide precursor and different degrees of dispersion of the precursor particles, allowing control of the physical properties of the resulting annealing separator.

While magnesium hydroxide precursors are generally produced at low temperature in prior art methods, aggregation of the particles is prominent at low temperature making it difficult to obtain particles with stable physical properties. According to the invention, however, after the magnesium hydroxide precursor has been aged at low temperature and high temperature, they are mixed together, thus vastly improving aggregation of the particles and allowing satisfactory control of both the dispersibility and stability of the particles. This improves the contact properties between the $MgO$ and $SiO_2$ during coating onto steel sheets, promoting growth of a forsterite layer.

In the high temperature ageing, the magnesium hydroxide slurry may be heated for 120 to 600 minutes at a temperature of 155 to 230° C. High temperature ageing results in adequate growth of the magnesium hydroxide precursor particles and improved dispersibility of the precursor particles. The temperature for high temperature ageing is preferably 155 to 200° C. and more preferably 160 to 180° C. A temperature of higher than 230° C. for the high temperature ageing will result in higher production cost and disadvantages for large-scale industrial production. A temperature of lower than 155° C. for the high temperature ageing will result in undesirable growth of the precursor particles. The high temperature ageing time is preferably 120 to 450 minutes, more preferably 120 to 240 minutes and most preferably 120 to 180 minutes. Carrying out high temperature ageing in this time range can avoid problems of insufficient growth of the precursor particles, or high dispersibility of the precursor particles which is disadvantageous for sintering in later stages, while also avoiding problems such as high energy consumption.

For low temperature ageing, ageing may be carried out for 60 to 300 minutes at a temperature of 10 to 100° C. Low temperature ageing results in slower growth of magnesium hydroxide, and causes suitable aggregation of the primary particles. This is advantageous for sintering in the later stage and can improve productivity. The temperature for low temperature ageing is preferably 30 to 90° C. and more preferably 50 to 90° C. If the temperature for low temperature ageing is higher than 100° C., growth of magnesium hydroxide will be more rapid and dispersibility of the secondary particles will be too high, tending to lower aggregation of the secondary particles and making it difficult to control the pore size and precipitation properties of the magnesium oxide that is produced afterwards. If the temperature for low temperature ageing is lower than 10° C., cooling will be required, thus incurring higher energy consumption which is disadvantageous for industrial large-scale production. The low temperature ageing time is preferably 80 to 180 minutes and more preferably 120 to 180 minutes. Carrying out low temperature ageing in this time range can avoid disadvantages for controlling the dispersibility, as well as problems such as excessively high dispersibility of the precursor particles.

The chemical reactions (1) and (2) and the low temperature ageing and high temperature ageing may be carried out with a reactor such as a high pressure reaction kiln commonly used in the field, depending on the specific conditions, and if necessary additional treatment such as cooling, heating or stirring may also be carried out.

In the production method of the invention, the high-temperature aged magnesium hydroxide and low-temperature aged magnesium hydroxide are mixed and the mixture is burned. The ratio of the high-temperature aged magnesium hydroxide and low-temperature aged magnesium hydroxide in the mixture may be 1:8 to 8:1, preferably 1:5 to 2:1 and more preferably 1:5 to 1:2, in terms of magnesium hydroxide mass. By controlling this ratio to within the aforementioned range it is possible to control the physical properties of the resulting annealing separator and to improve particle distribution, aggregation, precipitation and coatability. If the ratio is outside of the aforementioned range, the aggregated particle content will be too low or too high, potentially destroying the compositional balance of the particles and making it impossible to optimize the physical properties of the separator.

After the high-temperature aged magnesium hydroxide and low-temperature aged magnesium hydroxide have been mixed, and before burning, the mixed magnesium hydroxide may be further subjected to heat treatment at 100° C. or lower, as necessary.

The burning temperature may be 820 to 1150° C., preferably 840 to 1100° C. and more preferably 860 to 1050° C. If the burning temperature is controlled to within this range, it will be possible to obtain magnesium oxide with more satisfactory activity, aggregation and dispersibility (suspendability). In the aforementioned temperature range it is possible to avoid problems such as excessively high reactivity or excessively high water content, excessively low activity of the obtained magnesium oxide, low stability of the suspension, difficult functioning of the annealing separator, and difficulty in forming a satisfactory forsterite layer. The burning can be carried out in a rotary kiln such as a direct flame rotary kiln.

By using the production method of the invention it is possible to obtain magnesium oxide with high purity and excellent dispersibility (suspendability) and bonding strength, as an annealing separator.

The annealing separator obtained by the method is composed mainly of magnesium oxide. The magnesium oxide content may be 99.5 wt % or greater. It also comprises sodium at about 20 to 50 ppm. This low sodium content of the annealing separator is one of the features of the present invention. The method can also lower the content of impurities in the starting material and sodium introduced during the reaction process. A low sodium content can indicate the purity of the annealing separator of the invention.

The production method of the invention allows the pore size of the obtained annealing separator to be controlled as well. The mean pore size of the annealing separator may be 45 to 100 nm. By having such suitable physical properties, it is possible to optimize moisture residue in the annealing separator, to lower the residual moisture in the annealing separator after coating and burning to low levels and to thereby obtain a satisfactory forsterite layer.

The magnesium oxide obtained by burning can be used directly as an annealing separator. In order for the annealing separator to exhibit satisfactory properties, however, trace amounts of auxiliary agents or additives may be added as necessary before burning. Examples of trace additives include calcium (Ca), phosphorus (P), boron (B), sulfur (S), fluorine (F), chlorine (Cl), silicon (Si), cobalt (Co), zinc (Zn), nickel (Ni), copper (Cu), strontium (Sr) and aluminum (Al). These trace additives may also be added or be present in the form of oxides, salts or acids. When calcium is added, for example, it may be used in the form of calcium oxide, hydroxide, carbonate, nitrate, sulfate, silicate or phosphate. When phosphorus is added, it may be in the form of phosphoric acid, metaphosphoric acid, phosphonic acid or phosphonous acid, or as common salts such as alkali metal salts, alkaline earth metal salts or ammonium salts thereof. When boron is added, it may be in the form of boric acid, an alkali metal borate, an ammonium borate salt, an alkali metal metaborate or boron dioxide. When sulfur is added, it may be in the form of sulfuric acid or sulfurous acid, or an alkali metal salt, alkaline earth metal salt or ammonium salt thereof. When fluorine is added, it may be in the form of magnesium fluoride. When chlorine is added, it may be in the form of magnesium chloride. When silicon is added, it may be in the form of an alkali metal silicate, an alkaline earth metal silicate or colloidal silica.

Further addition of 0 to 25 wt % of inactive magnesium oxide and/or 0 to 10 wt % of titanium dioxide to the annealing separator obtained by burning can result in even more satisfactory properties for the annealing separator. Inactive magnesium oxide is magnesium oxide subjected to high-temperature burning at a temperature above the range of the invention. Because such a burning temperature is too high, at least some of the reactivity is lost.

The production method of the invention was explained above using an ammonium nitrate solution as an example; however, it is to be understood as also applying to other ammonium salts.

More specifically, according to one embodiment of the invention, the method for producing an annealing separator comprises the following steps:

Step (1): Magnesium oxide and an ammonium nitrate solution are mixed and reacted to prepare a magnesium nitrate solution and ammonia, the magnesium nitrate solution is purified, and the ammonia is recovered and concentrated and used to prepare ammonia water, after which the purified magnesium nitrate solution and ammonia water are reacted to obtain magnesium hydroxide, Step (2): One portion of the obtained magnesium hydroxide is subjected to high temperature ageing by heating for 120 to 180 minutes at a temperature of 160 to 180° C., while another portion of the obtained magnesium hydroxide is subjected to low temperature ageing by heating for 120 to 180 minutes at a temperature of 50 to 90° C., and Step (3): The magnesium hydroxides aged under the different conditions are mixed in a ratio of 1:8 to 8:1 in terms of magnesium hydroxide mass and burned at 860 to 1050° C. to obtain magnesium oxide for use as an annealing separator.

[Annealing Separator]

The annealing separator of the invention can be produced by the method described above; however, the annealing separator of the invention is not limited to being obtained by this production method. The annealing separator of the invention will now be described in detail.

The annealing separator of the invention has high purity and excellent dispersibility (suspendability) and bonding strength. By using the annealing separator of the invention it is possible to form uniform, dense forsterite layers on the surfaces of grain-oriented magnetic steel, thereby making it possible to obtain grain-oriented magnetic steel having excellent insulation and electromagnetic properties.

The annealing separator of the invention may be entirely composed of the magnesium oxide for an annealing separator according to the invention, or it may comprise the magnesium oxide for an annealing separator according to the invention as the major component. In the latter case, the content (purity) of the magnesium oxide for an annealing separator according to the invention may be 99.5 wt % or greater, with the remainder consisting of unavoidable impurities (such as Na).

The annealing separator of the invention has high purity as mentioned above. Specifically, the annealing separator of the invention has a low impurity content, and particularly a low sodium (Na) content, such as a sodium content of 20 to 50 ppm. This low sodium content is one of the features of the present invention. If sodium is present in an appropriate amount, it will be possible to lower the melting point of the oxide and thus promote the solid phase reaction, so that a forsterite layer can be advantageously formed. If the sodium content is lower than 20 ppm, the reaction promoting effect will be less notable, while if the sodium content is higher than 50 ppm, the reaction rate will be too rapid, which is disadvantageous for forming a dense forsterite insulating layer. The sodium content is preferably 25 to 50 ppm and more preferably 35 to 45 ppm. Sodium in the annealing separator of the invention derives primarily from impurities in the starting material and impurities introduced during the reaction process. A low sodium content can indicate the purity of the annealing separator of the invention.

The annealing separator of the invention has a sedimentation coefficient S of 0.90 or greater as defined by the following formula:

$$S=(100-V)/100,$$

where V is the volume (units: ml) of the supernatant after leaving 100 ml of a 10 wt % dispersion of the annealing separator to stand for 1 hour. For example, V of 15 is a supernatant volume of 15 ml.

The specific method for measuring the sedimentation coefficient may be the following, for example.

A 10 wt % annealing separator dispersion is prepared and homogeneously dispersed, and then 100 ml of the dispersion is immediately removed and placed in a 100 ml graduated cylinder and allowed to stand for a predetermined time, after which the sedimentation coefficient is calculated by the formula shown above.

With a sedimentation coefficient within this range, the annealing separator of the invention will have satisfactorily stable dispersibility and precipitation properties, existing in an extremely stable state that is resistant to aggregation. When the annealing separator of the invention is coated as a coating solution, it can remain in a satisfactory dispersed state as a coating for long periods, allowing coating unevenness of the coating layer to be reduced and improving the uniformity of the forsterite layer.

The annealing separator of the invention has a bonding strength of 80% or greater after coating onto a steel sheet surface, as defined by the following formula.

Bonding strength=[(Steel sheet weight after polishing−steel sheet weight before coating)/steel sheet weight before polishing−steel sheet weight before coating]×100%

By having such bonding strength, the annealing separator of the invention exhibits high bonding strength with high bonding affinity for steel sheets, and it is therefore resistant to separation from steel sheets, allowing it to exhibit an effect of promoting satisfactory reaction during the production process for a grain-oriented magnetic steel. If the bonding strength is lower than 80%, the forsterite layer formed after finishing annealing treatment can potentially become non-homogeneous, affecting the quality and outer appearance of the grain-oriented magnetic steel. The bonding strength is preferably 85% or greater and more preferably 88% or greater. The measuring methods described in the Examples are more specific methods to be used to determine bonding strength.

The mean pore size of the annealing separator of the invention powder may be 45 to 100 nm. By having such a pore size it is possible to optimize moisture residue in the annealing separator, thus lowering residual moisture in the annealing separator after coating and sintering to low levels, and allowing a satisfactory forsterite coating layer to be obtained. The mean pore size is more preferably 45 to 75 nm.

The ratio CAA70%/CAM40% for a 30° C. aqueous solution of the annealing separator is in the range of 1.8 to 4.0. CAA is the activity based on the reaction rate between the magnesium oxide particles and an acid, i.e. the citric acid activity (CAA). CAA represents the time until a citric acid aqueous solution is neutralized, when phenolphthalein indicator is mixed with a 0.4 N citric acid aqueous solution at a predetermined temperature (such as 30° C.), and the final reaction equivalent of magnesium oxide is added and stirred with the mixture. CAA can be used as an index to evaluate activity of an annealing separator in a grain-oriented magnetic steel. If the CAA70%/CAA40% ratio is in the range of 1.8 to 4.0, the annealing separator will exhibit suitable and satisfactory reactivity and a satisfactory coating film property can be obtained. Specifically, the CAA70% of the annealing separator may be 90 to 360 seconds. The CAA40% may be 50 to 90 seconds.

The mean particle size of the annealing separator is 0.5 to 5.0 m. Such a mean particle size will allow suitable aggregation of the annealing separator, thus resulting in satisfactory coating film properties.

Trace additives may also be added as auxiliary agents or additives as necessary during the process of producing the annealing separator of the invention, and before burning, as described above. The annealing separator of the invention may include the following trace additives, either alone or in combinations: calcium (Ca), phosphorus, (P), boron (B), sulfur (S), fluorine (F), chlorine (Cl), silicon (Si), cobalt (Co), zinc (Zn), nickel (Ni), copper (Cu), strontium (Sr) and aluminum (Al). The contents referred to in the concrete descriptions that follow are based on weight of the magnesium oxide for an annealing separator according to the invention.

The B content may be 500 to 1300 ppm. The presence of B can lower the melting point of the oxide and promote reaction; however, an excessively high B content will accelerate sintering of the magnesium oxide and can affect diffusion of the magnesium oxide particles in the $SiO_2$ layer, while also generating defects such as pits in the steel sheet surface.

The Cl content may be 100 to 350 ppm. Cl can suitably lower the melting point of mixed oxides, thereby exhibiting an effect that promotes reactivity of the annealing separator. If the Cl content is lower than the aforementioned range, however, the effect becomes less notable, while a content higher than the range promotes oxidation reaction of substrates and can impair formation of highly adhesive forsterite.

The Ca content in the case of CaO may be 0.2 to 0.6 wt %. Ca present in an appropriate amount in the form of CaO forms irregular interfaces between the substrate and insulating layer, thereby allowing adhesiveness of the coating layer to be improved, whereas an excessively high content can introduce problems in terms of quality.

The Si content in the case of $SiO_2$ may be 0.2 to 5.0 wt %. $SiO_2$ has a low melting point, and Si present in the form of $SiO_2$ can promote solid phase reaction and inhibit reaction between other divalent metals and the $SiO_2$ layer.

The annealing separator of the present application may also appropriately include Al in the form of $Al_2O_3$ or P in the form of $P_2O_3$. The tensile force of spinel compounds produced by $Al_2O_3$ is twice that of forsterite, and it can therefore improve the adhesiveness of the coating layer and the magnetism of the product. The $Al_2O_3$ and $P_2O_3$ contents may be 0.1 to 3 wt %.

The amounts of other trace additives included in the annealing separator of the invention are generally controlled to 0.5 wt % or lower. If the contents are too high, the metal oxides and magnesium will compete to form silicates other than with magnesium, which is disadvantageous for forsterite formation and can affect the performance of the final grain-oriented magnetic steel.

The annealing separator of the invention may further include titanium dioxide and/or inactive magnesium oxide, which may be added after burning. Inactive magnesium oxide is magnesium oxide burned at a high temperature above the range of the invention. Because such a burning temperature is too high, at least some of the reactivity is lost.

The amount of titanium dioxide added may be 0 to 10.0 wt %. During the annealing process, the titanium dioxide releases oxygen in amounts that contribute to formation of a uniform, dense forsterite layer. At the same time, $Ti^{3+}$ diffuses into the $SiO_2$ layer together with magnesium, increasing the stretching strength of the insulating layer and improving the physical properties including iron loss. If the titanium dioxide content is too high, excess free oxygen will be generated during the process of conversion from $Ti^{+4}$ to $Ti^{+3}$, producing problems such as blackheads in the grain-oriented magnetic steel surface.

The amount of inactive magnesium oxide added may be 0 to 25.0 wt %. Addition of inactive magnesium oxide can further increase the bonding strength between the substrate and the forsterite insulating layer that is formed. This is because the inactive magnesium oxide only participates partially in the reaction, itself undergoing minimal change, and it can therefore counteract the adverse effect of the large difference in expansion coefficient between the formed forsterite layer and the substrate. When inactive magnesium oxide is added, the proportion of the aforementioned other auxiliary agents can be increased commensurately with the proportion in which it is added, allowing the content ranges to be maintained for all of the magnesium oxide.

The annealing separator of the invention has high purity and excellent dispersibility (suspendability) and bonding strength, thus allowing formation of uniform, dense forsterite layers on the surfaces of grain-oriented magnetic steel, and thereby making it possible to obtain grain-oriented magnetic steel having excellent insulation and electromagnetic properties.

More specifically, the annealing separator according to one embodiment of the invention:
is composed mainly of magnesium oxide,
has a sodium content of 20 to 50 ppm,
has a sedimentation coefficient S of 0.90 or greater,
has a bonding strength of 80% or greater after coating onto a steel sheet surface, and
has a mean pore size of 45 to 100 nm.

[Grain-Oriented Magnetic Steel]

When the annealing separator is used, it is possible to obtain a grain-oriented magnetic steel according to the invention, the surface of which has a forsterite layer obtained using the annealing separator of the invention.

The grain-oriented magnetic steel of the invention can be produced by the following method. A silicon steel piece comprising silicon (Si) at 2.5 to 4.5% is subjected to publicly known hot rolling, annealing and cold rolling methods for adjustment to the prescribed thickness, after which it is subjected to decarburized annealing in a moist atmosphere. This forms an oxide film composed mainly of silica on the steel sheet surface. The annealing separator of the invention is then evenly dispersed in water to obtain a slurry. The slurry is continuously coated onto a steel sheet and baked, after which finishing annealing is carried out at 1200° C. for about 20 hours to form a forsterite layer ($Mg_2SiO_4$ coating film) on the steel sheet surface.

Since the grain-oriented magnetic steel of the invention has a forsterite layer formed from an annealing separator of the invention, it exhibits excellent insulating and electromagnetic properties.

EXAMPLES

The present invention will now be explained in greater detail using Synthesis Examples, Examples and Comparative Examples. However, it is to be understood that the invention is not limited only to these Synthesis Examples, Examples and Comparative Examples.

The methods of measurement will be explained first.

1. Measurement of Mean Particle Size

After placing 80 ml of ethanol in a 100 ml beaker and then adding 0.8 g of the dried annealing separator prepared in the Example or Comparative Example, the mixture was dispersed for 4 minutes with ultrasonic waves, after which a laser diffraction scattering particle size distribution analyzer (trade name: MT3000 by Nikkiso Co., Ltd.) was used to measure the mean particle size of the annealing separator.

2. Measurement of Sedimentation Coefficient

After weighing out 900 ml of water at 10° C. into a 1000 ml beaker and adding 100 g of the dried annealing separator prepared in the Example or Comparative Example, an IKA RW20 digital stirrer (product of IKA, Germany) was used for 60 minutes of dispersion treatment at a rotational speed of 2000 rpm/min, and 100 ml of the dispersion was immediately removed, placed in a 100 ml graduated cylinder and allowed to stand for 1 hour. The sedimentation coefficient was calculated by the following formula:

$$\text{Sedimentation coefficient}=(100-V)/100$$

V: Supernatant volume (ml); 100: graduated cylinder volume (ml)

For measurement of the sedimentation coefficient, the sedimentation coefficient was also measured after stationing for 24 hours as a reference value.

3. Measurement of Bonding Strength

A steel sheet was produced in the same manner as the steel sheet for evaluation described in "5. Forsterite coating film evaluation", except for changing the thickness to 0.5 mm, and the weight of a steel sheet with a size of 150 mm×80 mm×0.5 mm was precisely measured. After placing a precisely weighed amount of 20 g of the dried annealing separator obtained in the Example or Comparative Example in 150 ml of water at 20° C., an IKA RW20 digital stirrer (product of IKA, Germany) was used for vigorous stirring and dispersion at 2000 rpm for 1 minute, to obtain a coating solution. The coating solution was coated onto the aforementioned steel sheet of known weight using a roll coating machine. The coated steel sheet was placed in a muffle furnace at 500° C., sintered for 30 seconds, cooled and then weighed, after which the steel sheet was set in a vibrating rotator (Rotary hammer type vibrator by Iida Seisakusho, Japan). After placing 400 g of sea sand on the steel sheet, it was subjected to vibrating rotation processing (polishing) for 30 seconds (rotational speed: 60 Hz/290 rpm). The processed steel sheet was weighed and the bonding strength was calculated by the following formula. Four steel sheets were measured and the average value was calculated as the bonding strength.

Bonding strength=[(Steel sheet weight after polishing−steel sheet weight before coating)/steel sheet weight before polishing−steel sheet weight before coating]×100%

4. Quantitative Analysis of Elements

Quantitative analysis of the elements of interest was carried out using a ZSX PrimusII X-ray fluorescence spectrometer by Rigaku Industrial, Japan.

5. Forsterite Coating Film Evaluation

A silicon steel piece for a grain-oriented magnetic steel was subjected to hot rolling and cold rolling by known methods to a sheet thickness of 0.23 mm, and then decarburized annealing was carried out in a moist atmosphere (25% $N_2$+75% $H_2$) to produce a steel sheet for evaluation. The composition of the steel sheet before decarburized annealing was Si: 3.2%, C: 0.06%, Mn: 0.02%, Al: 100 ppm, N: 0.008% in terms of mass %, with the remainder consisting of iron and unavoidable impurities.

The annealing separator obtained in the Example or Comparative Example was prepared into a 100 g/L suspension (slurry), and titanium dioxide was added to the suspension until the titanium dioxide content was 7 wt % of the total magnesium oxides in the annealing separator. The homogeneously mixed slurry was hydrated in water at 10° C., and then coated onto an annealed steel sheet to a coating amount of 15 g/m² after drying of both sides of the steel sheet. After baking the steel sheet, it was wound into a roll and annealed at 1200° C. for 20 hours, after which it was flattened by hot stretching to produce a finished product steel sheet which was then evaluated in the following manner.

Coated film evaluation: The condition of the forsterite coating film on the steel sheet surface throughout the entire roll was visually observed. An evaluation of "VG" was assigned when the roll exhibited a dark gray color overall without distinct color differences and the film was lacking on less than 2% of the total area; an evaluation of "G" was assigned when the roll exhibited a dark gray color overall without distinct color differences and the film was lacking on less than 2 to 4% of the total area; an evaluation of "F" was assigned when the film was lacking on 4 to 6% of the total area; and an evaluation of "P" was assigned when the film was lacking on more than 6% of the total area.

Sheet form evaluation: When the reactivity of the annealing separator is poor, a wavy film coating forms on the edges of the steel sheet. An evaluation of "VG" was assigned when visual observation of the sheet form of the entire rolled steel sheet showed that the lengths of irregularities (wavy film coating) on the sheet surface at the edges in the lengthwise direction of the steel sheet were less than 2% of the lengths in the entire rolled steel sheet; an evaluation of "G" was assigned when the lengths of irregularities on the sheet surface irregularities were all less than 2 to 4% of the lengths in the entire rolled steel sheet; an evaluation of "F" was assigned when the lengths of irregularities on the sheet surface were 4 to 6% of the lengths in the entire rolled steel sheet; and an evaluation of "P" was assigned when the lengths of irregularities on the sheet surface were greater than 6% of the lengths in the entire rolled steel sheet.

6. Evaluation of Folding Limit

A 20 cm×20 cm×0.23 mm steel sheet was cut out from a finished product steel sheet obtained according to "5. Forsterite coating film evaluation" for use as a test piece, and was double-folded to 900 by hand, recording the number of times folding was possible until the coating film began to detach.

7. Dew Crystal Evaluation

A 20 cm×20 cm×0.23 mm steel sheet was cut out from the finished product steel sheet obtained according to "5. Forsterite coating film evaluation" for use as a test piece, and was visually observed to determine the number of dew crystals. An evaluation of "VG" was assigned when the number of dew crystals was 0 to 2; an evaluation of "G" was assigned when the number of dew crystals was 3 to 4; an evaluation of "F" was assigned when the number of dew crystals was 5 to 7; and an evaluation of "P" was assigned when the number of dew crystals was 7 or more. The dew crystals are "small holes" (coating layer defects) with diameters of 0.1 mm or greater that can be visually observed on the surface of the completed steel sheet, which result from insufficient reaction between MgO and $SiO_2$.

8. Measurement of CAA70%/CAM40%

After adding a 0.4 N citric acid solution ($1\times10^{-4}$ m³) and a 1% phenolphthalein solution in appropriate amount ($2\times10^{-6}$ m³) as an indicator into a $2\times10^{-4}$ m³ beaker, the liquid temperature was adjusted to 30° C. and a magnetic stirrer was used for stirring at 700 rpm, while simultaneously the annealing separator was added to the citric acid solution at 40% or 70% of the final reaction equivalent, and the time until final reaction, i.e. complete consumption of citric acid and neutralization, was measured. The CAA70%/CAA40% ratio was calculated from this measurement.

9. Measurement of Mean Pore Size

The mean pore size of the annealing separator obtained in the Example or Comparative Example was measured under the following conditions using a specific surface area/pore distribution analyzer (model: BELSORP-max by Microtrac-Bell).

Gas: $N_2$
Adsorption conditions: −196° C.
Pretreatment conditions: heating for 1 hour at 105° C.
Analysis program: BJH 10. Measurement of Depressed Deformation The finished steel sheet obtained according to "5. Forsterite coating film evaluation" was visually judged for presence or absence of the phenomenon of depressed deformation.

Specifically, "depressed deformation" is a depression phenomenon where stress is concentrated at the edges during the cooling process for a finished steel sheet due to the difference in stress generated near the edges and at the middle sections of the steel sheet.

SYNTHESIS EXAMPLES, EXAMPLES AND COMPARATIVE EXAMPLES

Preparation of Magnesium Hydroxide Precursor

In a reactor equipped with a stirrer, cooler, thermometer and gas suction port, lightly burned magnesium oxide powder (product of Liaoning Haicheng Houying Group, burning temperature of 950° C., a MgO content of 92.9 wt %, a $SiO_2$ content of 2.39 wt %, a CaO content of 2.36 wt %, an $Al_2O_3$ content of 0.19 wt % and a $Fe_2O_3$ content of 0.55 wt %) was loaded into an aqueous solution of ammonium nitrate (Henan Kaifeng Jinkai Chemical Co., Ltd.) at a molar ratio of $NH_4NO_3$/MgO=2 while heating at 100° C., dissolving the lightly burned magnesium oxide in the ammonium nitrate solution and reacting them, to generate a magnesium nitrate solution while discharging ammonia gas. The generated ammonia gas was placed in water, recovering it with the water, and was then concentrated to 10.0 mol/L as an alkali source. The generated magnesium nitrate solution was filtered and recovered, and adjusted to 3.5 mol/L as a magnesium source.

The purified magnesium nitrate solution, ammonia water and water were mixed in a proportion of 1.46 mol $Mg(NO_3)_2$ (417.14 ml):2.92 mol $NH_3 \cdot H_2O$ (292.0 ml):16.14 mol $H_2O$ (290.86 ml) at 25° C., and the magnesium nitrate and ammonia were reacted to obtain a magnesium hydroxide slurry with a concentration of 85 g/L (1.46 mol/L).

The obtained magnesium hydroxide slurry was divided into two portions, one of which was heated in a reactor at 70° C. for 150 minutes (designated as solution A); and the other of which was heated in an autoclave at 160° C. for 150 minutes (designated as solution B).

Synthesis Example 1

The magnesium hydroxide in solution A was filtered and rinsed and then re-dispersed in purified water, and appropriate amounts of $CaCO_3$, $B_2O_3$, $MgCl_2$ and $SiO_2$ were added to the dispersion for a CaO content of 0.45 wt %, a B content of 0.075 wt %, a Cl content of 0.02 wt % and a $SiO_2$ content of 0.40 wt % in the burned magnesium oxide, after which the mixture was stirred to form a dispersion.

The dispersion was dewatered, rinsed and dried. The dried powder was burned for 240 minutes in a rotary kiln at 1200° C. under an air atmosphere to obtain magnesium oxide. After pulverizing with a hammer mill, the powder was designated as Synthesis Example 1.

The obtained magnesium oxide powder of Synthesis Example 1 was subjected to elemental analysis, with the results shown in Table 1. Before adding the auxiliary agents, magnesium hydroxide was sampled and dewatered, rinsed, dried and burned in the same manner, and the obtained magnesium oxide was subjected to elemental analysis to measure the contents, the results of which are listed in Table 1.

Synthesis Example 2

Solution A and solution B were mixed at 83.33%:16.67% (i.e. a total of 100% for both, same hereunder) in terms of magnesium hydroxide mass, and then dewatered and rinsed, and re-dispersed in purified water. Next, $CaCO_3$, $B_2O_3$, $MgCl_2$ and $SiO_2$ were added to the liquid mixture. The addition ratios were the same as in Synthesis Example 1. After stirred dispersion, the mixture was dewatered, rinsed and dried. The dried powder was burned for 25 minutes in a rotary kiln at 940° C. under an air atmosphere to obtain magnesium oxide. After pulverizing with a hammer mill, the powder was designated as Synthesis Example 2.

The obtained magnesium oxide powder of Synthesis Example 2 was subjected to elemental analysis, with the results shown in Table 1. Before adding the auxiliary agents, the dispersed magnesium hydroxide was sampled and then dewatered, rinsed, dried and burned in the same manner, and the obtained magnesium oxide was subjected to elemental analysis to measure the contents, the results of which are listed in Table 1.

Synthesis Example 3

Solution A and solution B were mixed at 66.67%:33.33% in terms of magnesium hydroxide mass, and then dewatered and rinsed, and re-dispersed in purified water. Next, $CaCO_3$, $B_2O_3$, $MgCl_2$ and $SiO_2$ were added to the liquid mixture. The addition ratios were the same as in Synthesis Example 1. After stirred dispersion, the mixture was dewatered, rinsed and dried. The dried powder was burned for 25 minutes in a rotary kiln at 940° C. under an air atmosphere to obtain magnesium oxide. After pulverizing with a hammer mill, the powder was designated as Synthesis Example 3.

The obtained magnesium oxide powder of Synthesis Example 3 was subjected to elemental analysis, with the results shown in Table 1. Before adding the auxiliary agents, the dispersed magnesium hydroxide was sampled and then dewatered, rinsed, dried and burned in the same manner, and the obtained magnesium oxide was subjected to elemental analysis to measure the contents, the results of which are listed in Table 1.

Synthesis Example 4

Solution A and solution B were mixed at 33.33%:66.67% in terms of magnesium hydroxide mass, and then dewatered and rinsed, and re-dispersed in purified water. Next, $CaCO_3$, $B_2O_3$, $MgCl_2$ and $SiO_2$ were added to the liquid mixture. The addition ratios were the same as in Synthesis Example 1. After stirred dispersion, the mixture was dewatered, rinsed and dried. The dried powder was burned for 25 minutes in a rotary kiln at 940° C. under an air atmosphere to obtain magnesium oxide. After pulverizing with a hammer mill, the powder was designated as Synthesis Example 4.

The obtained magnesium oxide powder of Synthesis Example 4 was subjected to elemental analysis, with the results shown in Table 1. Before adding the auxiliary agents, the dispersed magnesium hydroxide was sampled and then dewatered, rinsed, dried and burned in the same manner, and the obtained magnesium oxide was subjected to elemental analysis to measure the contents, the results of which are listed in Table 1.

Synthesis Example 5

Solution A and solution B were mixed at 62.5%:37.5% in terms of magnesium hydroxide mass, and then dewatered and rinsed, and re-dispersed in purified water. Next, $CaCO_3$, $B_2O_3$, $MgCl_2$ and $SiO_2$ were added to the liquid mixture. The addition ratios were the same as in Synthesis Example 1. After stirred dispersion, the mixture was dewatered and dried. The dried powder was burned for 25 minutes in a rotary kiln at 940° C. under an air atmosphere to obtain magnesium oxide. After pulverizing with a hammer mill, the powder was designated as Synthesis Example 5.

The obtained magnesium oxide powder of Synthesis Example 5 was subjected to elemental analysis, with the results shown in Table 1. Before adding the auxiliary agents, the dispersed magnesium hydroxide was sampled and then dewatered, rinsed, dried and burned in the same manner, and the obtained magnesium oxide was subjected to elemental analysis to measure the contents, the results of which are listed in Table 1.

Synthesis Example 6

Solution A and solution B were mixed at 37.5%:62.5% in terms of magnesium hydroxide mass, and then dewatered and rinsed, and re-dispersed in purified water. Next, $CaCO_3$, $B_2O_3$, $MgCl_2$ and $SiO_2$ were added to the liquid mixture. The addition ratios were the same as in Synthesis Example 1. After stirred dispersion, the mixture was dewatered, rinsed and dried. The dried powder was burned for 25 minutes in a rotary kiln at 940° C. under an air atmosphere to obtain magnesium oxide. After pulverizing with a hammer mill, the powder was designated as Synthesis Example 6.

The obtained magnesium oxide powder of Synthesis Example 6 was subjected to elemental analysis, with the results shown in Table 1. Before adding the auxiliary agents, the dispersed magnesium hydroxide was sampled and then dewatered, rinsed, dried and burned in the same manner, and the obtained magnesium oxide was subjected to elemental analysis to measure the contents, the results of which are listed in Table 1.

Synthesis Example 7

Magnesium oxide powder was produced under the conditions for "Synthesis Example 1", except for burning at 940° C. for 25 minutes, and was designated as Synthesis Example 7.

The obtained magnesium oxide powder of Synthesis Example 7 was subjected to elemental analysis, with the results shown in Table 1. Before adding the auxiliary agents, magnesium hydroxide was sampled and dewatered, rinsed, dried and burned in the same manner, and the obtained magnesium oxide was subjected to elemental analysis to measure the contents, the results of which are listed in Table 1.

Only low temperature ageing was carried out for Synthesis Example 7.

Synthesis Example 8

Magnesium oxide powder was obtained according to the method of Example 2 in PTL 3: PCT/JP01/09354, and was designated as Synthesis Example 8.

Specifically, a rotary kiln was used for burning of magnesite at 1100° C. for 1 hour, to produce magnesium oxide having a BET specific surface area of $5.2\times10^3$ $m^2 \cdot kg^{-1}$. The magnesium oxide was loaded into water to a slurry concentration of 2 mol-kg and reacted at 90° C. for 2 hours to produce magnesium hydroxide having a BET specific surface area of $7.5\times10^3$ $m^2 \cdot kg^{-1}$. A rotary kiln was also used for burning at 980° C. for different times of 0.2 hour, 0.5 hour, 0.8 hour and 2 hours, after which pulverizing was carried out with an impact powdering machine to produce magnesium oxide particle aggregates with different degrees of burning. The four different magnesium oxide particle aggregates were then mixed in a mixing ratio of 25:30:15:30, to obtain a magnesium oxide particle aggregate for Synthesis Example 8.

The obtained magnesium oxide powder of Synthesis Example 8 was subjected to elemental analysis, the magnesium oxide content for which is listed in Table 1 as the MgO content before addition of auxiliary agents.

Synthesis Example 9

The magnesium hydroxide in solution B was filtered and rinsed and then re-dispersed in purified water, and appropriate amounts of $CaCO_3$, $B_2O_3$, $MgCl_2$ and $SiO_2$ were added to the dispersion. The addition ratios were the same as in Synthesis Example 1. After stirred dispersion, the mixture was dewatered, rinsed and dried. The dried powder was burned for 25 minutes in a rotary kiln at 940° C. under an air atmosphere to obtain magnesium oxide. After pulverizing with a hammer mill, the powder was designated as Synthesis Example 9.

The obtained magnesium oxide powder of Synthesis Example 9 was subjected to elemental analysis, with the results shown in Table 1. Before adding the auxiliary agents, magnesium hydroxide was sampled and dewatered, rinsed, dried and burned in the same manner, and the obtained magnesium oxide was subjected to elemental analysis to measure the contents, the results of which are listed in Table 1.

Only high temperature ageing was carried out for Synthesis Example 9.

Synthesis Example 10

Solution A and solution B were mixed at 94.44%:5.56 wt % in terms of magnesium hydroxide mass, and then dewatered and rinsed, and re-dispersed in purified water. Next, $CaCO_3$, $B_2O_3$, $MgCl_2$ and $SiO_2$ were added to the liquid mixture. The addition ratios were the same as in Synthesis Example 1. After stirred dispersion, the mixture was dewatered, rinsed and dried. The dried powder was burned for 25 minutes in a rotary kiln at 940° C. under an air atmosphere to obtain magnesium oxide. After pulverizing with a hammer mill, the powder was designated as Synthesis Example 10.

The obtained magnesium oxide powder of Synthesis Example 10 was subjected to elemental analysis, with the results shown in Table 1. Before adding the auxiliary agents, magnesium hydroxide was sampled and dewatered, rinsed, dried and burned in the same manner, and the obtained magnesium oxide was subjected to elemental analysis to measure the contents, the results of which are listed in Table 1.

Example 1

The magnesium oxide powder of Synthesis Example 2 and the magnesium oxide powder of Synthesis Example 1 were uniformly mixed in a mass ratio of 9:1, and the mixture was designated as Example 1. The mixing proportion for Example 1 is listed in Table 2.

The annealing separator of Example 1 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Example 2

The magnesium oxide powder of Synthesis Example 3 and the magnesium oxide powder of Synthesis Example 1 were uniformly mixed in a mass ratio of 9:1, and the mixture was designated as Example 2. The mixing proportion for Example 2 is listed in Table 2.

The annealing separator of Example 2 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Example 3

The magnesium oxide powder of Synthesis Example 4 and the magnesium oxide powder of Synthesis Example 1 were uniformly mixed in a mass ratio of 9:1, and the mixture was designated as Example 3. The mixing proportion for Example 3 is listed in Table 2.

The annealing separator of Example 3 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Example 4

The magnesium oxide powder of Synthesis Example 5 and the magnesium oxide powder of Synthesis Example 1 were uniformly mixed in a mass ratio of 8:2, and the mixture was designated as Example 4. The mixing proportion for Example 4 is listed in Table 2.

The annealing separator of Example 4 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

The annealing separator of Example 4 was photographed with a field emission scanning electron microscope (FE-SEM, 100,000×), and the obtained photograph is shown in FIG. 1.

Figure 2:
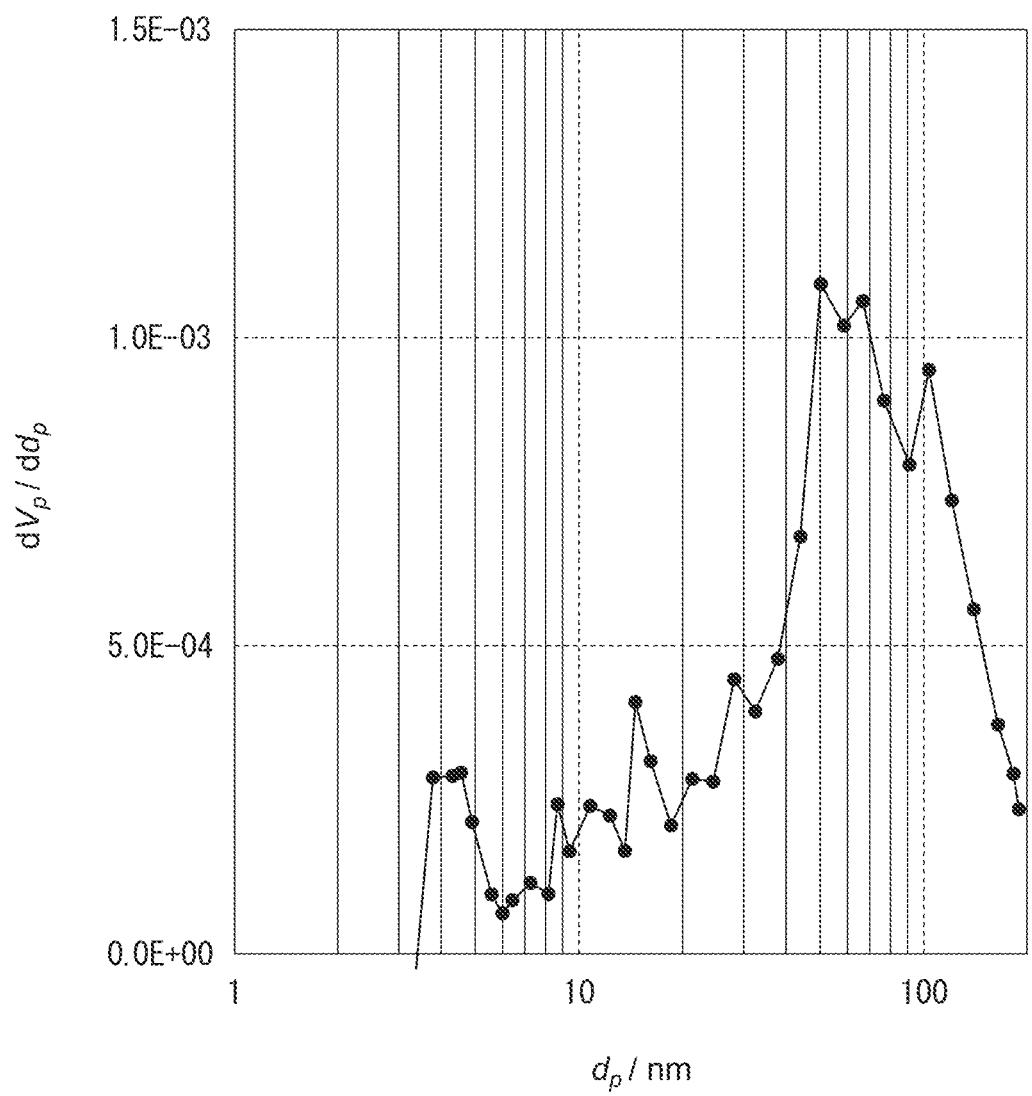
FIG. 2 is a measurement curve for mean pore size of the annealing separator of Example 4.

FIG. 2 shows a measurement curve for the pore sizes of the annealing separator of Example 4.

Example 5

The magnesium oxide powder of Synthesis Example 6 and the magnesium oxide powder of Synthesis Example 1 were uniformly mixed in a mass ratio of 8:2, and the mixture was designated as Example 5. The mixing proportion for Example 5 is listed in Table 2.

The annealing separator of Example 5 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Example 6

The magnesium oxide powder of Synthesis Example 3 and the magnesium oxide powder of Synthesis Example 1 were uniformly mixed in a mass ratio of 7.5:2.5, and the mixture was designated as Example 6. The mixing proportion for Example 6 is listed in Table 2.

The annealing separator of Example 6 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Comparative Example 1

The magnesium oxide powder of Synthesis Example 7 and the magnesium oxide powder of Synthesis Example 1 were uniformly mixed in a mass ratio of 9:1, and the mixture was designated as Comparative Example 1. The mixing proportion for Comparative Example 1 is listed in Table 2.

The annealing separator of Comparative Example 1 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Comparative Example 2

The magnesium oxide powder of Synthesis Example 9 and the magnesium oxide powder of Synthesis Example 1 were mixed in a mass ratio of 9:1, and the mixture was designated as Comparative Example 2. The mixing proportion for Comparative Example 2 is listed in Table 2.

The annealing separator of Comparative Example 2 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Comparative Example 3

The magnesium oxide powder of Synthesis Example 8 was used as Comparative Example 3.

The annealing separator of Comparative Example 3 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

Comparative Example 4

The magnesium oxide powder of Synthesis Example 10 and the magnesium oxide powder of Synthesis Example 1 were mixed in a mass ratio of 9:1, and the mixture was designated as Comparative Example 4. The mixing proportion for Comparative Example 4 is listed in Table 2.

The annealing separator of Comparative Example 4 was used for mean particle size measurement, sedimentation coefficient measurement, bonding strength measurement, forsterite coating film evaluation, folding limit evaluation, dew crystal evaluation, CAA70%/CAM40% measurement, pore size measurement and depressed deformation measurement by the methods described above, the results of which are listed in Table 3.

TABLE 1

| | before auxiliary | | | | | | |
| --- | --- | --- | --- | --- | --- | --- | --- |
| | MgO content before auxiliary agent addition (wt %) | Na content (ppm) | Mixing ratio of different Mg(OH)$_2$ (magnesium hydroxide mass ratio) | Auxiliary agent content (wt %) | | | |
| | | | | B | SiO2 | Cl | CaO |
| Synthesis Example 1 | ≥99.5% | 35 | Solution A: 100% | 0.077 | 0.39 | 0.017 | 0.44 |
| Synthesis Example 2 | ≥99.5% | 35 | Solution A/Solution B: 83.33%/16.67% | 0.076 | 0.37 | 0.018 | 0.45 |
| Synthesis Example 3 | ≥99.5% | 45 | Solution A/Solution B: 66.67%/33.33% | 0.078 | 0.35 | 0.018 | 0.47 |

TABLE 1-continued

| | | | before auxiliary | | | | |
| | MgO content before auxiliary agent addition | Na content | Mixing ratio of different Mg(OH)₂ (magnesium hydroxide | Auxiliary agent content (wt %) | | | |
| | (wt %) | (ppm) | mass ratio) | B | SiO2 | Cl | CaO |
| --- | --- | --- | --- | --- | --- | --- | --- |
| Synthesis Example 4 | ≥99.5% | 35 | Solution A/Solution B: 33.33%/66.67% | 0.075 | 0.40 | 0.018 | 0.45 |
| Synthesis Example 5 | ≥99.5% | 50 | Solution A/Solution B: 62.5%/37.5% | 0.075 | 0.43 | 0.018 | 0.42 |
| Synthesis Example 6 | ≥99.5% | 35 | Solution A/Solution B: 37.5%/62.5% | 0.075 | 0.37 | 0.018 | 0.42 |
| Synthesis Example 7 | ≥99.5% | 35 | Solution A: 100% | 0.080 | 0.38 | 0.023 | 0.42 |
| Synthesis Example 8 | ≥98.5% | 55 | — | Not measured | Not measured | Not measured | Not measured |
| Synthesis Example 9 | ≥99.5% | 35 | Solution B: 100% | 0.079 | 0.39 | 0.018 | 0.41 |
| Synthesis Example 10 | ≥99.5% | 35 | Solution A/Solution B: 94.44%/5.56% | 0.079 | 0.39 | 0.018 | 0.41 |

TABLE 2

| | Compositional ratio |
| --- | --- |
| Example 1 | Synthesis Example 2/Synthesis Example 1 = 9:1 |
| Example 2 | Synthesis Example 3/Synthesis Example 1 = 9:1 |
| Example 3 | Synthesis Example 4/Synthesis Example 1 = 9:1 |
| Example 4 | Synthesis Example 5/Synthesis Example 1 = 8:2 |
| Example 5 | Synthesis Example 6/Synthesis Example 1 = 8:2 |
| Example 6 | Synthesis Example 3/Synthesis Example 1 = 7.5:2.5 |
| Comp. Ex. 1 | Synthesis Example 7/Synthesis Example 1 = 9:1 |
| Comp. Ex. 2 | Synthesis Example 9/Synthesis Example 1 = 9:1 |
| Comp. Ex. 3 | Synthesis Example 8 |
| Comp. Ex. 4 | Synthesis Example 10/Synthesis Example 1 = 9:1 |

TABLE 3

| | | | | particle | | | | | | | |
| | Sedimentation coefficient 1 hr | Sedimentation coefficient 24 hr | Bonding strength (%) | Mean particle size (μm) | Pore size (nm) | Mg₂SiO₄ coating film evaluation | CAA70%/ CAA40% | Dew crystal | Sheet form | Depression | Folding limit |
| --- | --- | --- | --- | --- | --- | --- | --- | --- | --- | --- | --- |
| Example 1 | 0.96 | 0.86 | 89.3 | 2.3 | 68.5 | VG | 2.17 | VG | VG | No | >10 |
| Example 2 | 0.96 | 0.86 | 89.5 | 2.4 | 58.9 | VG | 2.14 | VG | VG | No | >10 |
| Example 3 | 0.9 | 0.87 | 88.0 | 2.8 | 70.5 | VG | 2.20 | VG | VG | No | >10 |
| Example 4 | 0.9 | 0.8 | 90.2 | 2.7 | 50.4 | VG | 2.15 | VG | VG | No | >10 |
| Example 5 | 0.96 | 0.87 | 80 | 3.0 | 48.5 | VG | 2.05 | VG | VG | No | >10 |
| Example 6 | 0.96 | 0.87 | 85.6 | 3.6 | 60.8 | G | 3.20 | G | VG | No | >10 |
| Comp. Ex. 1 | 0.91 | 0.82 | 78.5 | 2.4 | 15.0 | G | 2.85 | G | G | No | 10 |
| Comp. Ex. 2 | 0.88 | 0.78 | 28.4 | 5.8 | 110 | G | 2.90 | G | G | No | 8 |
| Comp. Ex. 3 | 0.65 | 0.64 | 14.7 | 4.5 | 43.6 | G | 2.43 | P | G | Yes | 9 |
| Comp. Ex. 4 | 0.66 | 0.70 | 65 | 3.7 | 17.5 | G | 2.40 | P | G | Yes | 8 |

As these data show, annealing separators satisfying the features of the invention are superior based on measurement of the sedimentation coefficient, bonding strength, forsterite coating film evaluation, folding limit, dew crystal evaluation and depressed deformation, and thus have very high utility for industry. The annealing separators outside of the range of the invention, on the other hand, failed to meet at least one of the requirements based on measurement of the sedimentation coefficient, bonding strength, forsterite coating film evaluation, folding limit, dew crystal evaluation and depressed deformation, and were therefore inferior to the annealing separators of the invention.

The invention claimed is:

1. An annealing separator composed mainly of magnesium oxide, wherein:
   a Na content is 20 to 50 ppm,
   a sedimentation coefficient S is 0.90 or greater, and
   a bonding strength after coating onto a steel sheet surface is 80% or greater,
   a mean pore size of the annealing separator is 45 to 100 nm,
   the sedimentation coefficient S is defined by the following formula:

$$S = (100 - V)/100,$$

where V is the volume (units: ml) of the supernatant after leaving 100 ml of a 10 wt % dispersion of the annealing separator to stand for 1 hour,
   the bonding strength is defined by the following formula:

Bonding strength=[(Steel sheet weight after polishing−steel sheet weight before coating)/steel sheet weight before polishing−steel sheet weight before coating]×100%.

2. The annealing separator according to claim 1, wherein a ratio CAA70%/CAA40% in a 30° C. aqueous solution of the annealing separator is in a range of 1.8 to 4.0, the CAA represents the time until a citric acid aqueous solution is neutralized, when phenolphthalein indicator is mixed with a 0.4 N citric acid aqueous solution at 30° C., and the final reaction equivalent of magnesium oxide is added and stirred with the mixture.

3. The annealing separator according to claim 1, which further comprises at least anyone of a following, based on weight of magnesium oxide:

B: 500 to 1300 ppm;
Cl: 100 to 350 ppm;
CaO: 0.2 to 0.6 wt %;
$SiO_2$: 0.2 to 5.0 wt %;
titanium dioxide: 0 to 10.0 wt %; or
inactive magnesium oxide: 0 to 25.0 wt %.

4. The annealing separator according to claim 1, wherein a mean particle size of an annealing separator particle is 0.5 to 5.0 m.

5. A grain-oriented magnetic steel that has on its surface a forsterite layer obtained using an annealing separator according to claim 1.

6. An annealing separator composed mainly of magnesium oxide, wherein:

a Na content is 20 to 50 ppm,
a sedimentation coefficient S is 0.90 or greater,
a bonding strength after coating onto a steel sheet surface is 88% or greater, and
a mean pore size is 45 to 75 nm,
the sedimentation coefficient S is defined by the following formula:

$$S=(100-V)/100,$$

where V is the volume (units: ml) of the supernatant after leaving 100 ml of a 10 wt % dispersion of the annealing separator to stand for 1 hour, the bonding strength is defined by the following formula:

Bonding strength=[(Steel sheet weight after polishing−steel sheet weight before coating)/steel sheet weight before polishing−steel sheet weight before coating]×100%.

* * * * *

UNITED STATES PATENT AND TRADEMARK OFFICE
CERTIFICATE OF CORRECTION

PATENT NO. : 12,330,957 B1  
APPLICATION NO. : 19/045718  
DATED : June 17, 2025  
INVENTOR(S) : Xingdong Wang Page 1 of 1

It is certified that error appears in the above-identified patent and that said Letters Patent is hereby corrected as shown below:

In the Claims

Column 24, Line 27, Claim 1, "greater, and" should be -- greater, --.

Column 24, Line 29, Claim 1, "greater," should be -- greater, and --.

Column 25, Line 17, Claim 4, "5.0 m." should be -- 5.0 μm. --.

Signed and Sealed this  
Fourth Day of November, 2025

John A. Squires  
*Director of the United States Patent and Trademark Office*